(12) United States Patent
Weiss et al.

(10) Patent No.: US 11,687,677 B2
(45) Date of Patent: Jun. 27, 2023

(54) METHOD FOR PRODUCING A SECURITY DEVICE

(71) Applicant: Authentic Vision GmbH, Salzburg (AT)

(72) Inventors: Thomas Weiss, Salzburg (AT); Thomas Bergmüller, Salzburg (AT)

(73) Assignee: AUTHENTIC VISION GMBH, Wals (AT)

( * ) Notice: Subject to any disclaimer, the term of this patent is extended or adjusted under 35 U.S.C. 154(b) by 129 days.

(21) Appl. No.: 17/049,410

(22) PCT Filed: May 3, 2019

(86) PCT No.: PCT/EP2019/061341
§ 371 (c)(1),
(2) Date: Oct. 21, 2020

(87) PCT Pub. No.: WO2019/211422
PCT Pub. Date: Nov. 7, 2019

(65) Prior Publication Data
US 2021/0240864 A1 Aug. 5, 2021

(30) Foreign Application Priority Data
May 4, 2018 (EP) .................................. 18170800

(51) Int. Cl.
*G06F 7/58* (2006.01)
*G06F 21/73* (2013.01)
(Continued)

(52) U.S. Cl.
CPC .............. *G06F 21/73* (2013.01); *G06F 7/588* (2013.01); *G06F 21/44* (2013.01); *G06F 21/78* (2013.01)

(58) Field of Classification Search
CPC .......... G06F 21/73; G06F 21/44; G06F 21/78; G06F 7/588
See application file for complete search history.

(56) References Cited

U.S. PATENT DOCUMENTS

2009/0274298 A1* 11/2009 Schmitt-Lewen ..... B42D 25/29
380/54
2015/0076219 A1* 3/2015 Pao .................... G06Q 30/0185
235/375

(Continued)

FOREIGN PATENT DOCUMENTS

EP 3293680 A1 3/2018
WO 2016202827 A1 12/2016

(Continued)

OTHER PUBLICATIONS

Optical security features by using information carrier digital screening, by F Koltai—Optical Security and Counterfeit Deterrence . . . , 2002 (Year: 2002).*

(Continued)

*Primary Examiner* — Vu V Tran
(74) *Attorney, Agent, or Firm* — Husch Blackwell LLP (57) ABSTRACT

Method for producing a security device (1) comprising the following steps: providing at least one stochastic selector (8), generating a coupling between an identifier (11) and one particular combination of security features (6) from a finite set (5) of distinct combinations of security features based on the at least one stochastic selector (8), registering the coupling in a database (12); and applying an identification element (3) comprising the identifier (11) and a non-printable security element (2) comprising the particular combination of security features (6) according to the coupling to a substrate (22) to produce a security device (1).

14 Claims, 6 Drawing Sheets

(51) Int. Cl.
    *G06F 21/44*     (2013.01)
    *G06F 21/78*     (2013.01)

(56) References Cited

U.S. PATENT DOCUMENTS

| | | |
|---|---|---|
| 2015/0188706 A1 | 7/2015 | Weiss |
| 2016/0267369 A1 | 9/2016 | Picard et al. |
| 2016/0297231 A1 | 10/2016 | Weiss |
| 2017/0232779 A1* | 8/2017 | Viens .................. G02B 5/0205 |
| | | 359/558 |
| 2017/0286974 A1 | 10/2017 | Weiss et al. |

FOREIGN PATENT DOCUMENTS

| | | |
|---|---|---|
| WO | 2018046746 A1 | 3/2018 |
| WO | 2018172498 A1 | 9/2018 |

OTHER PUBLICATIONS

European Extended Search Report; Application No. 18170800.9; dated Aug. 31, 2018; 10 Pages.
International Search Report and Written Opinion of the International Searching Authority; Application No. PCT/EP2019/061341; Completed: Jun. 18, 2019; dated Jun. 27, 2019; 10 Pages.
Saloomeh Shariati: "Image-based Physical Unclonable Functions for Anti-counterfeiting"; Saloomeh Shariati: "Image-based Physical Unclonable Functions for Anti-counterfeiting", PhD thesis; Feb. 28, 2013; XP055501527; U RL: https ://dial .uclouvain.be/pr/boreal/object/boreal :124681 /datastream/ PDF _01/view; Retrieved on Aug. 22, 2018; 124 Pages.

\* cited by examiner

METHOD FOR PRODUCING A SECURITY DEVICE

TECHNICAL FIELD

The present teaching concerns a method for producing a security device, a corresponding set of security devices as well as a method for registering an additional random security feature of such a security device and a corresponding authentication system. Specifically, the present teaching concerns optically readable security devices, i.e. of which authentication can be performed with a programmable device comprising a camera.

BACKGROUND

Optically readable security devices are widely used today, because they are cost-effective in high-volume production and can be verified with standard equipment, i.e. a programmable device comprising a camera. Prominent examples for verification devices are smart-phones, handheld-scanners, tablet-PCs or personal computers connected to any kind of camera. In a typical setting, an optically verifiable security device comprises at least two elements. One is typically an identification element, e.g. a serial number, and at least one other is a security element comprising security features.

Many of today's security devices, especially those for optical authentication purposes, rely on random security features. Typically, such a security device is produced with a randomized process, e.g. by exploiting manufacturing tolerances. Due to the random nature, the security features and/or their distribution among the security device are unpredictable. Consequently, after producing a particular security device they then need to be extracted, e.g. by sensors or optical means, and are then typically registered to a security device identifier, e.g. in a database. Commonly, the random security features of each individual security device are extracted immediately after producing the security device using an optical sensor, digitised and then stored in a database, which is indexed through the security device's identifier.

The PhD thesis of Saloomeh Shariati ("Image-based Physical Unclonable Functions for Anti-counterfeiting", 28 Feb. 2013) describes such a system, which requires an optical recognition of the proposed security features at the manufacturer's premises (see section 5.1.1, step 3 on page 77).

As mentioned, such optical security devices are preferably used in high-volume production. They are cost-effective, because they can be produced relatively easy at high production speeds, e.g. security devices based on optically variable devices via hot stamping and/or digital print. Consequently, in that setting high-end optical sensors, e.g. fast cameras, are required to capture the security devices and eventually extract the random security features in real-time. Such optical sensors are—due to the high through-put requirement—expensive. For very high production speeds, e.g. printing speeds of 100 m/min and more, no capable optical sensors are available, implying the production speed needs to be reduced, further implying a cost increase.

Requiring an optical sensor system hence is a significant investment and/or limiting factor. This investment may only amortize in very high quantities. The integration of a suitable optical sensor, e.g. a camera system, can be exemplarily estimated at €50 000. We assume it is used to capture optically readable security devices with per-unit production costs of €0.001 in high volumes. Now even when 50 million security devices are produced, requiring such an optical sensor system ultimately doubles the total costs of ownership (TCO) to €0.002 per security device entity. Even more so, the TCO drastically increases when the security devices are produced on multiple parallel production lines, e.g. when using an in-mold process or direct part marking, as each production line has to be equipped with such an optical sensor system.

Another main benefit of optically readable security devices is their capability to easily integrate into existing labels and packaging. This is due to the fact that many of them can be produced by standard production techniques, e.g. hot-stamping, digital printing, etc. These are widespread technologies, which label- and packaging manufacturers typically facilitate. Many security solution providers design their security devices to be producible with said standard technologies. This ensures low integration costs. However, random security devices on the other hand require installing a costly optical sensor system at the production to enable them to produce their security devices. These costs are often neglected in the first place.

Summarizing, random optical security devices, especially those relying on manufacturing tolerances, are very cost-effective to produce. Yet the imperative need to capture the security features after production by an optical sensor increases the total costs of ownership drastically and amortizes only in very high quantities.

The randomness of a security device guarantees its unpredictability and ultimately its irreproducibility. Irreproducible means that even with all-embracing knowledge, material and tools it is impossible or very difficult or expensive to reproduce one particular security device multiple times, i.e. multiple security devices sharing the same identifier and the same security features. Several technologies rely on the fact, that it is very difficult—hence costly—to produce a mimicked security device with the same identifier as the original one, which also shares the particular security features registered to that identifier in a database. Examples can be found in our earlier applications US 2015/0188706 A and US 2016/0297231 A.

In any case, as long as the database is not disclosed, a counterfeiter needs to get hold of each security device he wants to mimic.

Another major advantage of random security devices, especially those relying on manufacturing tolerances as a source of randomness, is that also the entitled producer of original security devices is unable to design a cost-efficient process to fraudulently produce multiple entities sharing the same security device identifier, which may then be sold on the black market. This makes such random security devices suitable for licensing-compliance use cases.

To overcome the random security feature extraction by optical sensors and therefore lower the total costs of ownership, we proposed in US 2017/0286974 A a system to register random security features during the first authentication attempt, provided a preliminary authentication (i.e. a plausibility check) returns a positive result. While this works well for all use cases, where an individual security device is scanned multiple times, it has shortcomings by design for e.g. product authentication use cases, where a security device is expected to be authenticated only once. This is due to the fact that—by the design of the system—the first authentication attempt is only secured by a plausibility check.

In WO 2018/046746 A1 we propose a method and base material for improving the security of such a preliminary authentication.

In WO 2018/172498 A1 we proposed to design a security foil, where parts of a functional layer in an original material are removed and at least partially replaced by a printed marker. With this method it is possible to design a security device comprising at least two elements. A first identification element may be produced by having the printed marking containing a serial number. The remaining parts of the functional layer may serve as a second, optically readable security element comprising distinguishable security features. One may then produce a security foil in a centralized production line, where also an optical sensor, e.g. a camera, is set up to capture the random security features and registers it to the corresponding identifier. The randomness is introduced e.g. by the clearance of the functional layer or the alignment between the identification element and the functional layer being subject to manufacturing tolerances. The main benefit is that said security device is transferrable to any object, e.g. via hot stamping, in a single production step. As the registration between random security features and identifier happens centralized when producing the foil, no additional reading of the security device is needed when integrating the security device onto a label/packaging/object. Therefore no additional investments at a printing facilities or security device manufacturers are needed, as this is done centralized. Although we also presented a method to structure the security foil in a way, such that unregistered transfer methods can be used, tests have shown that for practical applications a registered transfer method, e.g. registered hot stamping, is required. Such registered transfer equipment is not industry-standard. For integration of the security device, the manufacturers would therefore need to invest in such registered transfer equipment. This tends to be at least as expensive as a suitable optical sensor, e.g. a camera, and therefore the TCO can only be decreased using the present teaching for facilities, which already own such equipment supporting registered transfer.

As mentioned, one of the main advantages of random optical security devices is their irreproducibility. Hence, they are suitable for licensing compliance use cases, where even the entitled security device manufacturer cannot produce a security device twice, hence preventing fraudulent double-producing etc.

However, there are other use cases, where the producer of the original security devices is trusted. There is a need for security devices and production methods that avoid the costs associated with optical registration (summarized above) and at the same time offer a level of security that approximates that of irreproducible random security devices, e.g. those based on manufacturing tolerances.

One important property of security devices is that they are uncopiable. Among others, US 2016/0267369 A introduces a 2D-Code, which cannot be copied and is therefore difficult to reproduce. This present teaching relies on printing small, randomized dots smaller than 50 µm. The authors claim that due to their small size, these dots cannot be copied without introducing errors. These security devices are expected to be very cost-effective in production, as they can be produced in a single printing step. However, using photocopiers with sufficient resolution (e.g. more than 1200 dpi) or a high-resolution scanner and suitable printing hardware, this security device can be assumed to be reproducible and furthermore it can be copied.

Similarly, WO 2016/202827 A1 suggests a serialization process, where the serial number is embedded in a modified printed barcode. The barcode is modified in a way, such that e.g. the line widths/module sizes are altered randomly within the barcode-standard's tolerance magnitudes. Hence the barcode remains readable by any standard reader. In verification, with a special reader those variations are evaluated. Naturally, such a security feature, which is introduced preferably digitally in pre-print, can be copied and reproduced provided one uses hardware with sufficient resolution.

SUMMARY

It is an object of the present teaching to overcome the shortcomings of the prior art.

The method according to the present teaching for producing a security device comprises the following steps:
  providing at least one stochastic selector,
  generating a coupling between an identifier and one particular combination of security features from a finite set of distinct combinations of security features based on the at least one stochastic selector,
  registering the coupling in a database; and
  applying an identification element comprising the identifier and a non-printable security element comprising the particular combination of security features according to the coupling to a substrate to produce a security device.

The identifier and combination of security features are preferably readable by a programmable device comprising a camera for authentication purposes. To overcome resolution-related attack vectors, we propose to use a non-printable security element, e.g. a kinegram, hologram, optically variable device, watermark, engraving, etc. Typically, such non-printable security elements exhibit three-dimensional properties, e.g. viewing-angle dependent optical properties. For example, the process can be designed to guarantee that any produced security element comprises one out of N known, unambiguous combinations of optical security features. The selection from the set of N known unambiguous combinations of optical security features is performed in a stochastic way. Such a security device shares all properties (in particular the unpredictability and copy-proofness) of a security device comprising manufacturing-tolerance related random security features, except for its irreproducibility. One important benefit of the present teaching is that no optical sensor is required for registration, as a deterministic production process ensures that we know the unambiguous security features of a particular security element a priori and can therefore—without employing any optical means—assign (or register) it to the corresponding identification element (or its identifier respectively).

Although a counterfeiter might be able to set up a process to mimic one particular security device multiple times, it is possible and common to detect such counterfeiting events by monitoring the access count on the corresponding database entries per identifier. If one identifier has an access count well above average (i.e. well above the typical authentication rate), this indicates that this particular security device has probably been disclosed and mimicked and for subsequent verification attempts a corresponding warning or—negative—result is issued. Similar to irreproducible random security devices, a profit-oriented counterfeiter, e.g. product counterfeiting, would need to produce multiple mimicked security devices, such that the counterfeit attempt is not detected by monitoring the access count. Due to the unpredictability of the security device, this implies that the counterfeiter needs to get hold of a high number of genuine security devices in order to assess the stochastic assignment (or registration) between identification element and security element. As the genuine security devices are attached (or protecting) original products, getting hold of them in high quantities can be considered difficult and costly. Hence the proposed security device can be considered to offer a reasonably high protection.

Correspondingly, the present teaching proposes a set of security devices, wherein each security device comprises:
- at least one identification element and
- at least one non-printable security element, wherein the at least one identification element comprises an identifier, wherein the at least one non-printable security element exhibits one particular combination of security features from a finite set of distinct combinations of security features, wherein a coupling represented by the security device between the identifier of the at least one identification element and the particular combination of security features of the at least one non-printable security element is stochastic.

In a preferred embodiment, the step of generating a coupling may comprise: providing an identifier for the security device; selecting one particular combination of security features from a finite set of distinct combinations of security features according to at least one stochastic selector; and coupling the provided identifier with the selected particular combination of security features. For example, the identifier may be provided according to a well-defined sequence or it may be generated from other information suitable for identifying a security device (a timestamp, a production facility, etc.). This embodiment can integrate with pre-defined identifiers, because it does not impose any requirements on the content or structure of the identifier, other than that it provides a means for reasonably differentiating different (subsequent) security devices.

Advantageously, the step of providing an identifier is providing a unique identifier. This avoids the possibility of duplicate couplings and increases the use of the identifier for detecting counterfeits by access rate analysis. A unique identifier may be provided by picking from a pre-defined set without replacement or by recording previously provided identifiers and discarding duplicates during subsequent generation. Correspondingly, with respect to the present set of security devices, it is advantageous that each identifier is a unique identifier.

Alternatively, the method may comprise generating the identifier from the generated stochastic selector or one of the generated stochastic selectors for coupling with the particular combination of security features. In this case, the security element may be picked according to a fixed or at least predictable sequence (e.g. using subsequent parts from a larger foil), without detriment to the stochastic property of the coupling.

With the same advantages and according to a further similar alternative of the present method, one particular identifier may be selected from a pre-defined set of available identifiers based on the generated stochastic selector or one of the generated stochastic selectors for coupling with the particular combination of security features.

Preferably, providing at least one stochastic selector within the present method comprises obtaining at least one stochastic selector from a random number source, wherein the random number source is based on a hardware random number generator or on a software random number generator with an unpredictable seed. The hardware or software random number generator preferably characterized in being a true random number generator (TRNG), i.e. producing truly random, stochastic, unpredictable random numbers. Within the scope of the present teaching, the hardware or software random number generator may also be a pseudo-random number generator seeded by a (hardware) stochastic entropy source, e.g. detecting cosmic noise, high-precision timestamps, keystrokes, digitizing floating inputs of an analogue-digital converter or any other method well-known to people skilled in the art.

In a preferred embodiment of the present method, the non-printable security element comprises at least one uniquely identifiable marking and the finite set of distinct combinations of security features contains available uniquely identifiable markings or possible combinations of uniquely identifiable markings, wherein the coupling is between an identifier and one particular uniquely identifiable marking or combination of uniquely identifiable markings from a finite set of uniquely identifiable markings or combinations of uniquely identifiable markings. Correspondingly, the non-printable security element may comprise at least one uniquely identifiable marking and the finite set of distinct combinations of security features contains available uniquely identifiable markings or possible combinations of uniquely identifiable markings. The uniquely identifiable markings contained on the security element indicate the position and geometry of the security element if the security element is a section taken from a security foil, wherein the uniqueness of the identifiable markings is with respect to the entire security foil. When the position and geometry of the section is determined by one or more stochastic selectors, the uniquely identifiable markings contained in said section can be determined from the knowledge of the entire security foil and the applicable stochastic selectors.

There are several possible techniques for producing the security device that can be used within the scope of the present teaching. Some exemplary options for applying the non-printable security element to a substrate are: bin-like selection of a pre-produced non-printable security element; digital foiling of the non-printable security element from a master foil [e.g. Digital Metal by Kurz or digital cold-foiling]; producing the non-printable security element by direct part marking; in-molding the non-printable security element; or cutting the non-printable security element from a sheet-like product. While most of these options will be understood as alternatives, the list is not exclusive: for example, security elements cut from a sheet-like product may be incorporated in a security device (e.g. integrally with a protected product) by in-molding. Similar, the list is not exhausting, there may be alternative technologies suitable to produce a security device according to the present method.

Concerning the set provided by the present teaching, it is preferred that the identification element of each security device encodes the identifier in a human-readable and/or machine-readable format. For example, the identification element may comprise numbers, alphanumeric symbols, a barcode and/or a 2D-barcode. Human-readable encodings provide the advantage, that authentication may be initiated manually. Moreover, the identifier can be used for user feedback concerning a marked product. Machine-readable encodings are typically more robust to physical damage and less error-prone during readout.

Advantageously, the non-printable security element of each security device has optically diffractive characteristics. Such characteristics provide for effective protection against replication by scanning and printing at sufficient resolution.

It is not necessary that the identification element and the non-printable security element are separate parts. In particular, the identification element and the non-printable security element may be embodied by a single element comprising an identifier and exhibiting one particular combination of security features from a finite set of distinct combinations of security features.

It has turned out particularly advantageous to apply the present teaching to improve preliminary authentication as described in our earlier US 2017/0286974 A, the content of which with respect to further improvements specific to the registration process and its advantages is incorporated herein by reference. In this context the present teaching proposes a method for registering an additional random security feature of a security device (or product) to an identifier of the security device (i.e. generally, a reproducible identification feature of the product) in a database (i.e. such that the random security feature is linked to the identifier), comprising:

performing a preliminary authentication check of a security device produced according to the present teaching, comprising:

determining an identifier of the security device;

determining a particular combination of security features present on the security device and selected from a finite set of distinct combinations of security features;

determining that the preliminary authentication check is positive if a coupling between the determined identifier and the determined particular combination of security features is registered in the database; and registering the additional random security feature, e.g. one based on manufacturing tolerances, if the preliminary authentication check is positive;

wherein any subsequent definitive authentication check of the security device may use the registered additional random security feature.

The above method combines the advantages of randomly created security features (mainly irreproducibility) with the advantages of randomly selected security features (cost-effective registration) while minimizing the security implications of not registering the randomly created (here: additional) security features at a trusted party.

The above method further preferably comprises capturing the additional random security feature to be registered with a mobile user reading device and transmitting the captured additional random security feature from the mobile user reading device to the database during the performing of the method. It can be decided at the end of the database, whether the received information is used for verification or registration. If this decision is taken at the database, a potential attacker controlling the mobile user reading device cannot determine whether the security device will undergo a preliminary or definitive authentication check. Similar, it is well known that if the decision is taken on the mobile user reading device, a black box-like software structure with encrypted inputs and outputs may be used, to prevent disclosing the registration status or other information to a potential attacker.

The step of registering the additional random security feature may preferably comprise entering the captured additional random security feature in the database and linking the captured additional random security feature to the identifier after a positive preliminary authentication check.

Correspondingly, the present teaching also proposes an authentication system comprising:

a database storing couplings between identifiers and additional random security features of security devices; and a mobile user reading device adapted to capture (in particular by optical means, e.g. comprising a camera), an identification element (comprising an identifier), a non-printable security element and an additional random security feature of a security device for authentication of the security device;

wherein:

the mobile user reading device is adapted to initiate a preliminary authentication check of the security device on the basis of a captured identification element and a captured non-printable security element, wherein the captured identification element comprises an identifier, and wherein the captured non-printable security element comprises a particular combination of security features from a finite set of distinct combinations of security features, during use, the database is searched for an entry comprising a coupling between the identifier and the particular combination of security features and, if a matching entry is found, the preliminary authentication check is positive; and if the preliminary authentication check is positive, the captured additional random security feature is registered in the database.

BRIEF DESCRIPTION OF THE DRAWINGS

The present teaching will be defined in more detail below by means of preferred exemplary embodiments, to which it is not to be limited to, however, and with reference to the drawings.

DETAILED DESCRIPTION

When designing a suitable production process for security devices according to the present teaching, there's one fundamental property; the production process has to be deterministic for all steps necessary to produce a single security device and yet have stochastic variation among different security devices, which makes it impossible to predict the security features of the K+1st produced security device from any or all of the previously produced K security devices.

Maintaining a deterministic process while producing a single security device is beneficial, because all parameters—e.g. the optical properties of the security features exhibited by the at least one security element—are predictable and hence known a priori. This allows production without the use of a capturing device, i.e. a camera, as no unpredictable steps are involved.

However, it is also important to establish an unpredictable variation among security devices, which makes it impossible to conclude from K already produced security devices on the appearance of the K+1st security device.

Figure 1:
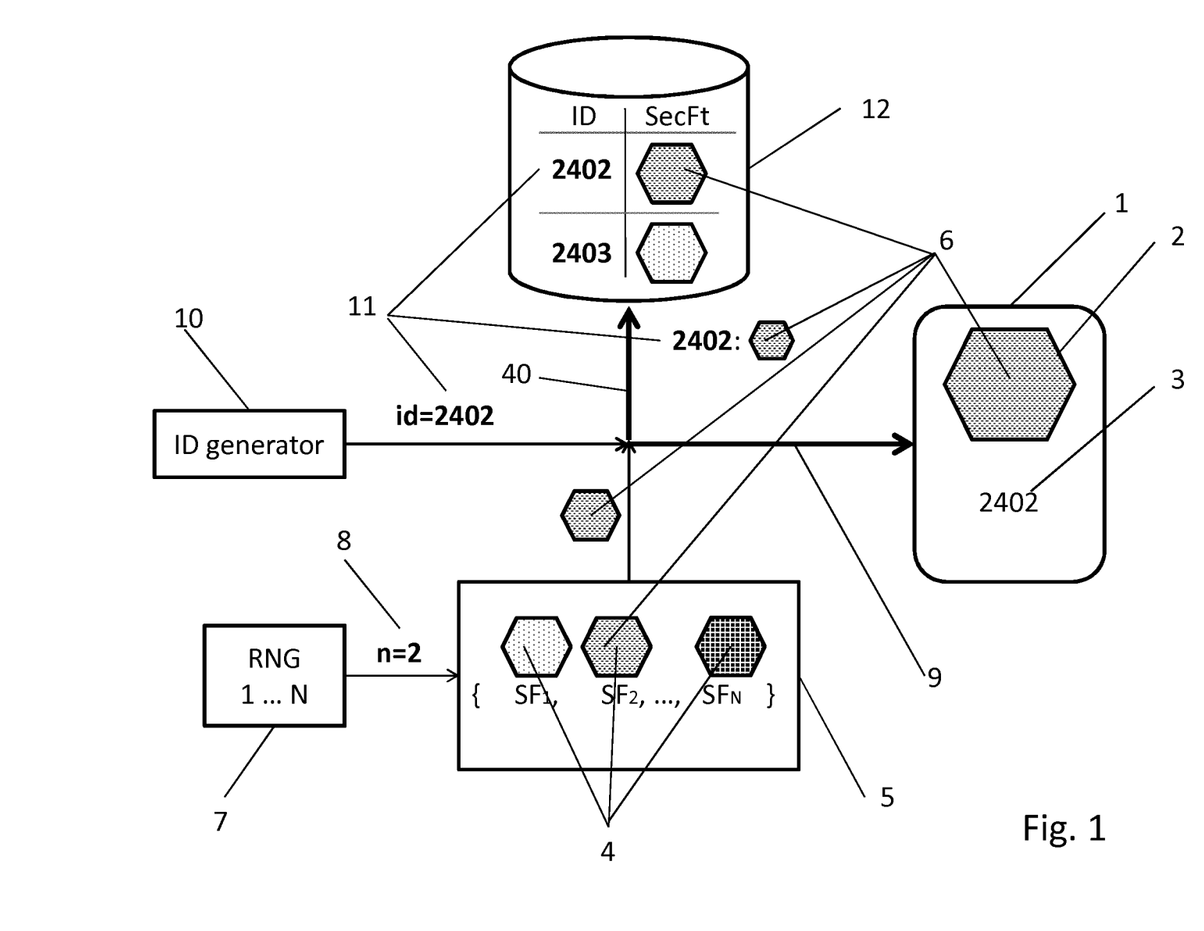
FIG. 1 schematically shows the concept behind the present teaching.

FIG. 1 displays the abstract system. In production of a security device 1 comprising a security element 2 and an identification element 3, we assume it is possible to produce a security element 2 which is guaranteed to comprise at least one particular combination of security features 6 from a finite set 5 of N distinct combinations of security features 4 {SF1 . . . SFN}. We also assume there is a process, which allows us deterministically to select or manufacture the at least one security element 2 with a particular combination of security features 6 out of the finite set 5 of known distinct combinations of security features 4. In a preferable setting we may therefore employ a random number generator 7, which randomly or pseudo-randomly (with an unpredictable seed) generates a stochastic selector 8 in the range 1 . . . N. It is well known for people skilled in the art, that a pseudo-random generator can be considered (with some limitations) as being truly random, if an analogue input or any other unpredictable and stochastic source is used as a seed. Prominent examples are seeding with cosmic noise, human input (mouse movement, keyboard strokes) or generating random numbers by quantizing a floating analogue input etc. FIG. 1 exhibits an example, where the random number generator 7 generates the stochastic selector 8 (n=2). Therefore, in production 9, a security element 2 with the particular combination of security features 6 of the n=2nd element in the finite set 5 of known distinct combinations of security features 4 is produced. In parallel, an identifier generator 10 is used to generate a—preferably unique— identifier 11 (in the example the id=2402 is used). In production, the identifier 11 is encoded in the identification element 3. While FIG. 1 exhibits a human-readable representation of the identification element 3, in practical applications the use of optically machine-readable codes, e.g. a barcode or 2D-Code, may be beneficial. Parallel to production 9, the particular combination of security features 6 chosen by the stochastic selector 8 are coupled with the identifier 11 and stored in a database 12. In practical applications it may be more efficient to only store the stochastic selector 8, as the stochastic selector 8 unambiguously allows to reconstruct the corresponding particular combination of security features 6 from the finite set 5 of known distinct combinations of security features 4. The production process 9 is required to solely depend on the triple of input parameters, namely the identifier 11, the finite set 5 of known distinct combinations of security features 4 and the stochastic selector 8 (n). Assuming a number of K already produced security devices and all process parameters (e.g. the finite set 5 of known distinct combinations of security features 4, production materials, . . . ) being known and readily available, it must not be possible to predict the K+1st security device, i.e. the coupling of the identification element 3 comprising the identifier and the at least one security element 2, or more particular, the security element's 2 particular combination of security features 6.

Summing up, the production process has to be deterministic within the production of one particular entity of a security device and yet completely independent to any other produced entity of a security device. The deterministic behavior is of particular importance, as it allows predicting the appearance, i.e. the particular combination of security features 6 of the security element 2. The coupling between the particular combination of security features 6 and the identifier 11 can therefore be done without the use of a sensor or capturing device, i.e. a camera. This is one of the main benefits of the present teaching, as it minimizes integration effort and therefore decreases the total costs of ownership.

Figure 2:
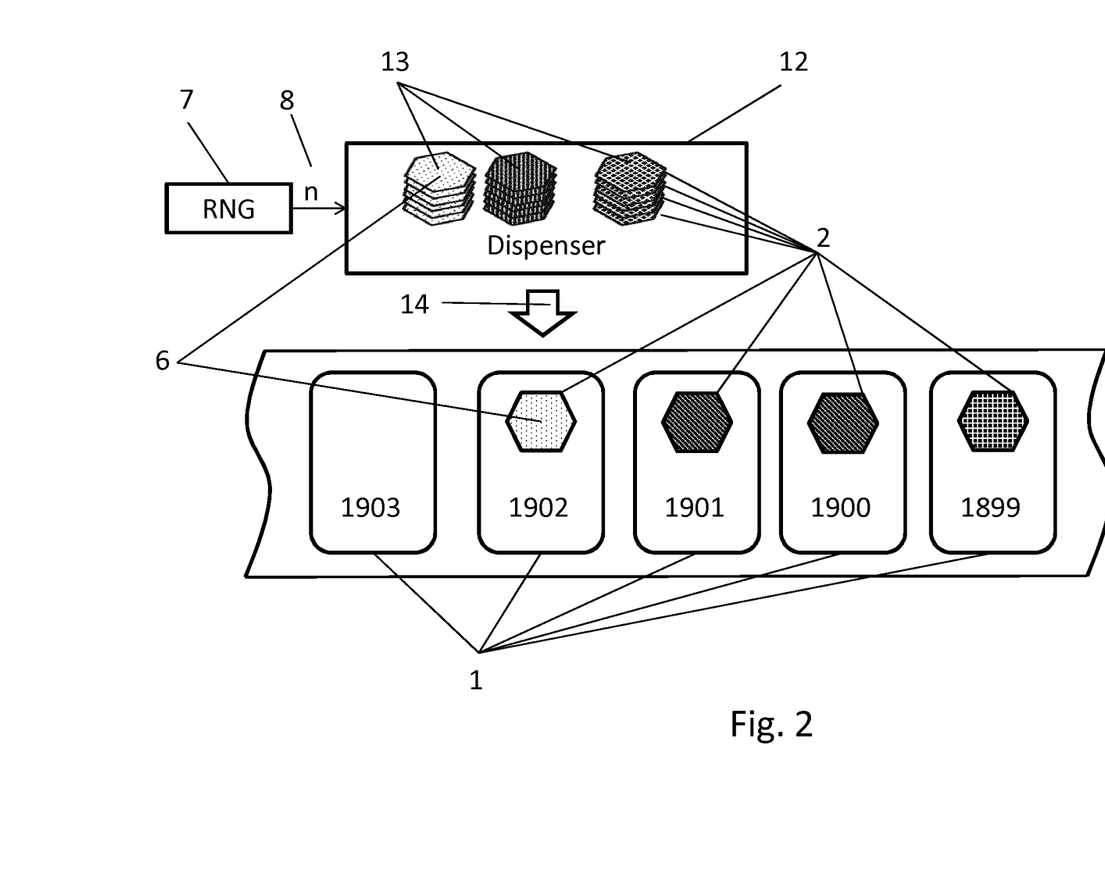
FIG. 2 schematically shows an implementation of selecting security elements from a dispenser.

There are many ways to come up with a suitable process to produce security devices comprising at least one identification element 3 comprising an identifier 11 and at least one non-printable security element 2, which are coupled using at least one stochastic selector. In the following, we describe (but not limited to) several approaches based on figures:

FIG. 2 displays a bin-based approach. At the production line, a dispenser 12 is set up. Assuming we have N known distinct combinations of security features 4 in the finite set 5, the dispenser comprises N bins. Each bin contains multiple security elements 2, where all security elements 2 within a particular bin 13 share the same particular combination of security features 6. The random number generator 10 is then used to generate a stochastic selector 8 (n), which controls the dispenser 12, such that it releases 14 one security element entity 2 from the n-th bin corresponding to the generated stochastic selector (n) 8. This naturally requires pre-production and sorting the security elements 2 into bins 13 based on their particular distinct combinations of security features 4. For the application of the security devices any suitable industrial standard process may be used, e.g. hot-stamping, cold-foiling, heat- or pressure-transfer, adhesives etc.

Figure 3:
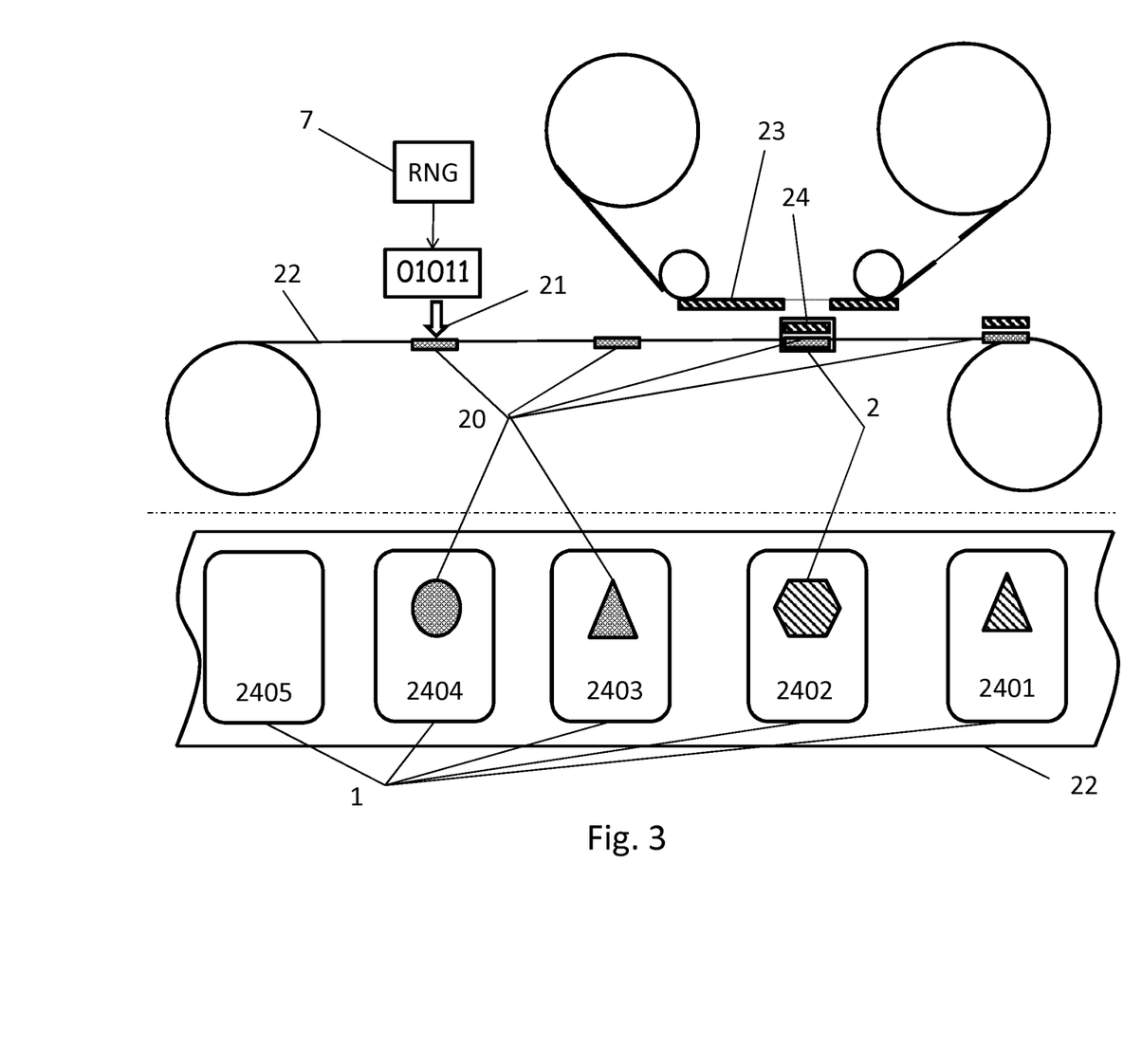
FIG. 3 schematically shows an implementation based on digital cold foiling the security elements.

FIG. 3 displays an alternate production method. For this method, technologies such as digital cold foiling, Digital Metal (LEONHARD KURZ Stiftung & Co. KG, Deutschland) etc. may be used. For illustrational purposes, the bottom part of FIG. 3 shows the substrate material 22 with the produced security devices. The production direction is from left to right, while the production step of applying the identification elements 3 onto the substrate material 22 is not displayed.

An adhesive pattern 20 is digitally printed 21 onto a substrate material 22. In a preferable setting, the digitally printed adhesive pattern 20 forms the particular combination of security features 6 for a security element 2. As only a finite number of patterns (limited by the resolution of the digital printing unit 21) can be produced, this complies with the finite set 5 of distinguishable and known distinct combinations of security features 4. For illustrational purposes, we use the outline shape as known distinct combinations of security features 4.

The digital printing unit 21 is controlled by a random number generator 7. Based on the generated stochastic selector (n) 8, a particular digital adhesive pattern 20 is printed. Note that the same adhesive pattern may occur multiple times, e.g. the triangle-shaped security elements 2 of the security devices 1 identified by 2401 and 2403 are identical. Hence the security devices identified by 2401 and 2403 will have the same particular combination of security features 6 stored in the database, coupled to their respective identifiers 11.

In a second production step, a suitable raw material 23, e.g. a holographic foil, is applied to the substrate 22 containing the printed patterns 20. At the regions, where the printed adhesive pattern 20 is present, the applied substrate is transferred 24. In all other regions, the substrate material remains unchanged. Consequently, after the transfer process 24, the security element 2 as a compound of a particular adhesive pattern 20 and the corresponding transferred raw material 23, is produced. The printed adhesive pattern 20 therefore defines the particular combination of security features 6 of a certain security device 1. As the adhesive pattern 20 is generated based on a stochastic selector (n) 8, the production process is deterministic for the production of a particular security device 1. Yet it is unpredictable, i.e. the shape of the adhesive pattern 20 for the security device 1 identified by 2405 cannot be predicted for subsequently produced security devices by any means.

A very similar not pictured approach is to use the raw material, comprising the optical effects, as a substrate material and mask out the non-desired parts. This can be done e.g. by having a holographic foil and (digitally) over-printing the non-security element parts with e.g. white ink. The printed pattern may be controlled by a stochastic selector. In the same production step, the identification element may be produced, i.e. by printing the identifier, either in a human-readable form or encoded in a machine-readable way, e.g. a barcode.

In another not pictured embodiment, a production environment may be set up, which produces a static security element which always comprises the very same particular combination of security features 6 from of a finite set 5 of known distinct combinations of security features 4. As the security element 2 is static, the identifier has to be generated or selected in a randomized way to establish a stochastic coupling between the particular combination of security features 6 and the identification element 3. This process may be beneficial in practice, as it allows setting up a production line to produce a larger number of security devices all sharing a first particular combination security features 6. After a certain period of time (or on another machine line), the production line is set up to produce a larger number of security devices all sharing a second particular security feature 6. As long as the identifiers 11 are randomly distributed 64 among set ups and the produced security devices 1 beneficially mixed after production, this serves the purpose.

Figure 4:
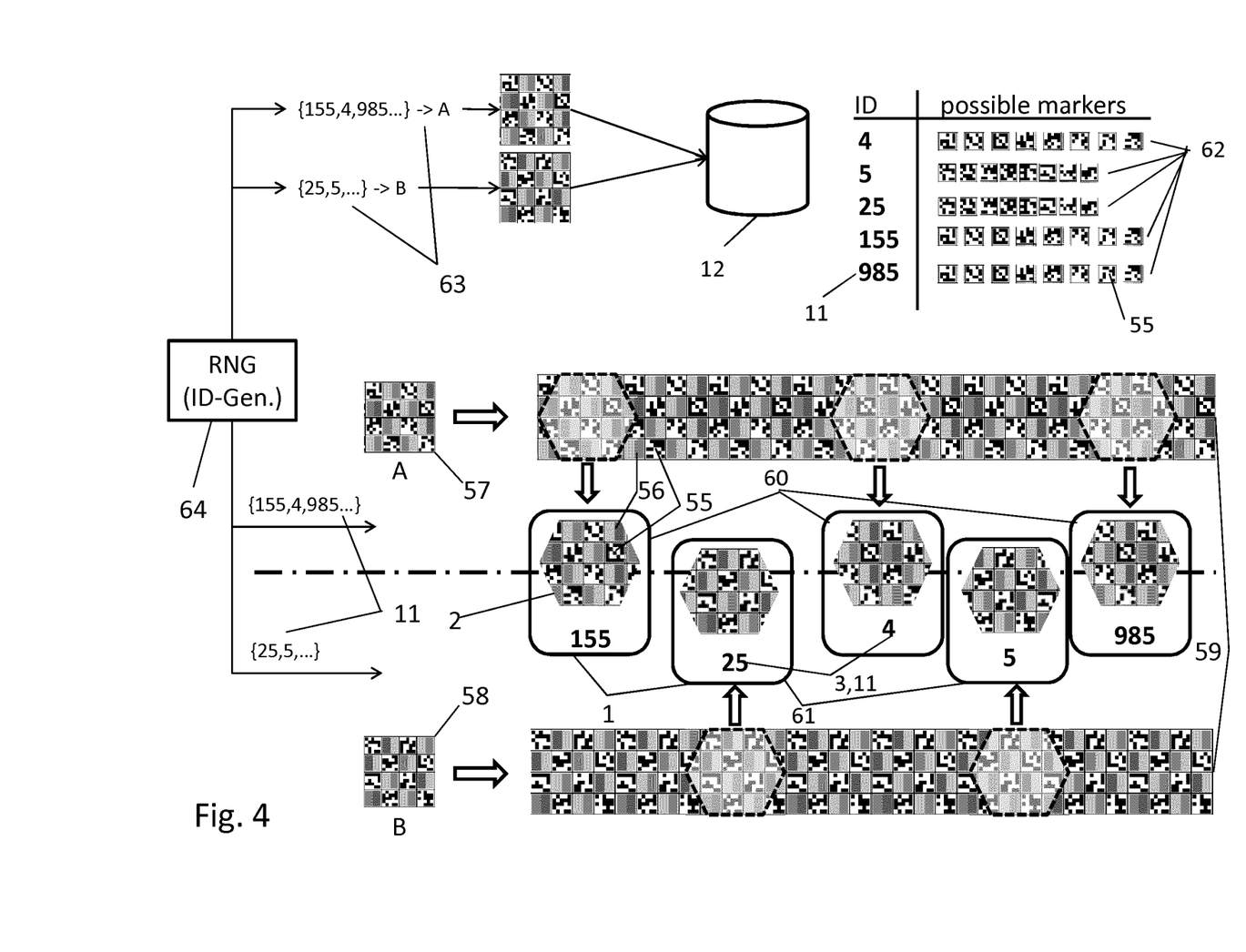
FIG. 4 schematically shows another embodiment based on selecting security elements from a sheet-like product comprising security features.

FIG. 4 displays one preferred embodiment employing the use of a sheet-like product as introduced in WO 2018/046746 A1 to manufacture security elements. Such a sheet-like product 59 material comprises uniquely identifiable markers 55 and security features 56, which are pre-determined relative to the position of the uniquely identifiable markers 55 within the sheet-like product 59. In a typical setting, such a sheet-like product 59 is produced from an origination 57, e.g. by a master artwork defining the optical properties 56 (e.g. optically diffractive grating characteristics) and alignment of the uniquely identifiable markers 55 within one square inch. The sheet-like product is then produced by embossing the origination A 57 in a tiled, two-dimensional manner. Consequently, all security features 56 and uniquely identifiable markers 55 contained in the origination are repeated, thus forming the finite set 5 of known distinct combinations of security features 4. One may then produce at least a second origination B 58 for the sheet-like product, which has uniquely identifiable markers 55 different form the first origination. Hence, each uniquely identifiable marker 55 is attributable to its particular origination 57, 58.

A production environment is then set up, such that one production line produces security devices 1 comprising security elements 2 produced from a sheet-like product 59 attributable to a first origination A 57 and at least one other production line set up to produce security devices 1 comprising security elements 2 taken from a sheet-like product 59 attributable to the second origination B 58. By randomly distributing 64 the identifiers 11 among the differently configured production lines, one can generate 63 the database 12 entries and produce corresponding identification elements 3 thereof.

Practically, it may be preferable due to cost-effectiveness to set-up the production machine with the sheet-like product 59 attributable to the first origination A 57, produce a larger set of security devices 60 with randomly generated identifiers and/or identifiers selected from all available identifiers based on a stochastic selector. Later, the production machine is set-up with another sheet-like product attributed to the at least one other origination B 58 and produces another set of security devices 61. Further, in practice, production lines typically feature more than one production lane, hence security elements 2 produced from different lanes perpendicular to the forward-feed of the sheet-like product 59 will contain different combinations of uniquely identifiable markings 55 in a mutually exclusive way. Consequently, as the origination 57, 58—hence the distribution of uniquely identifiable markers 55—is known a priori as well as the geometrical set-up of the machine, in the data base 12 each security device identifier 11 may be coupled to a set of possible uniquely identifiable markers 62, forming the particular combination of security features. If an unregistered transfer method is used to produce security elements 2 from the sheet-like product 59, it has to be ensured that each security element 2 contains at least one uniquely identifiable marker 55. If a registered transfer method is used, one can ensure that always the same uniquely identifiable marker 55 is contained within the security device, ultimately limiting the number of elements in the set of potentially possible uniquely identifiable 62 markers to a single marker. Practically speaking, the security device identifier 11 is coupled to one or more uniquely identifiable markers 55, which correspond to the particular combination of security features.

The optical properties of the sheet-like product 59 are arranged and known (from the master artwork design) relative to the uniquely identifiable markers 55 in a spatial way. Hence, in verification, the programmable device comprising a camera is configured to read the identification element 3 extracting the identifier 11 and detect the at least one uniquely identifiable marker 55 of the security element 2. If the uniquely identifiable marker 55 is part of the set of possible uniquely identifiable markers 62, i.e. the particular combination of security features, registered to the particular identification element 11 in the database 12, the optical properties 56 can be resolved and verified by computer vision means on the programmable device comprising a camera.

Regardless whether a registered or unregistered production process is used, any manufacturing step will be subject to manufacturing tolerances. Security features corresponding to those manufacturing tolerances may be—additionally to the security features, which are part of the set of known security features—employed as random (thus irreproducible) additional security features.

Another not pictured approach is to combine technologies from FIG. 3 and FIG. 4. One may set up a digital process as suggested in FIG. 3 to produce a very high number of patterns, i.e. apply adhesive in a very high number of distinct patterns. In particular, one may set up the system in a way such that the outline and shape of the security element 2, corresponds to the identification element 3 hence corresponding to the identifier 11. In particular, one may set up such a digital process to apply adhesive in the form of human-readable numbers, 2D-Codes (e.g. the "black" modules formed by the adhesive, "white" modules left blank, i.e. the substrate visible) or any other optically readable form. In a second step, the non-printable security devices are produced. Similar to FIG. 4, by switching raw materials and using a random distribution of identifiers one is able to create a security device 1 where the security element 2 and the identification element 3 overlap. I.e. the outline and shape of the security element 2 form the identification element 3 and encode the identifier 11. The optical characteristics of the material used for producing the security element 2 (hence it's interior) correspond to particular combinations of security features 6 chosen from a finite set 5 of known distinct combinations of security features 4.

Figure 5:
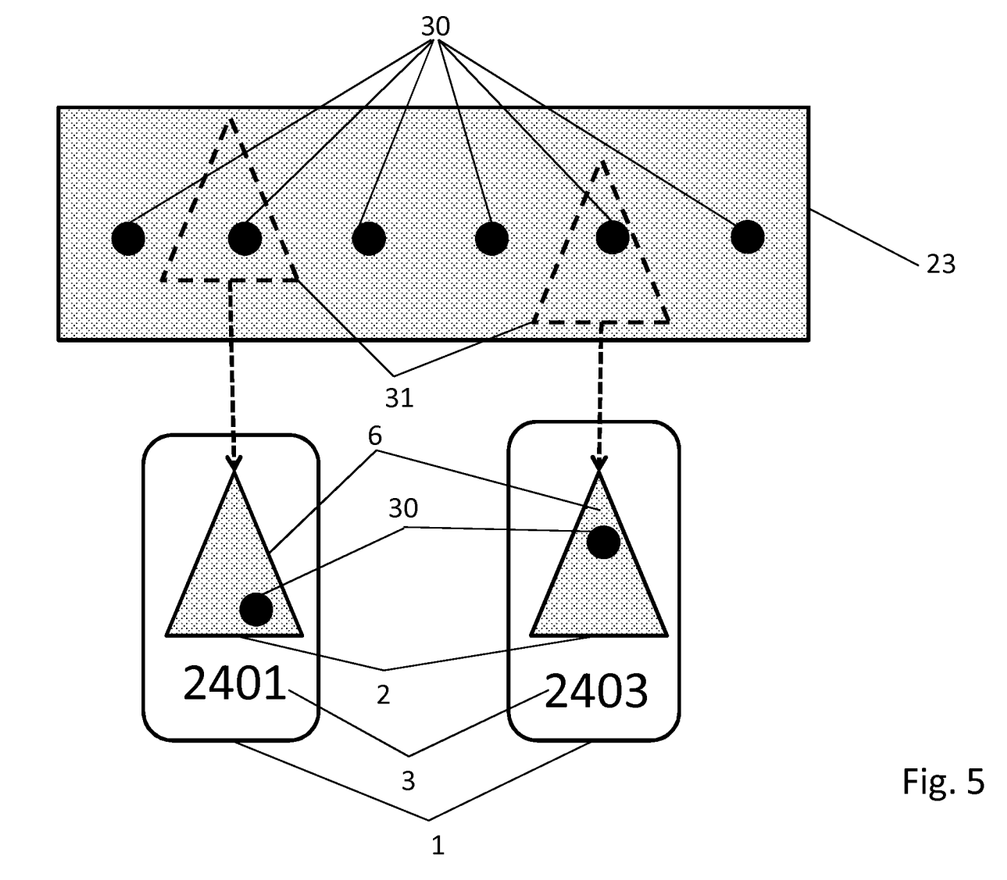
FIGS. 5 and 6 schematically show yet another embodiment where the security features are determined by geometric shapes combined with additional truly random security features.

As an illustrative example, FIG. 5 displays two security devices 1 and a raw material 23. The raw material has markings 30, e.g. but not necessarily in a periodic pattern. The displayed markings are illustrative and may also be a certain distribution of optical properties (colors, diffraction effects, gratings, . . . ), machine readable code fragments etc.

The two security devices 1 are identifiable through different identification elements 3, e.g. 2401 and 2403. Both security devices comprise a security element 2 with the same particular combination of security features 6 (illustrated in the image through shading and the triangular outline), which were selected from the finite set 5 of known distinct combinations of security features 4. Yet, due to manufacturing tolerances, each security element 2 comprises additional random features as well, which may e.g. be caused by imperfections when transferring/cutting the security elements 2 characterized by the particular combination of security features 6. These imperfections may e.g. be a cutting offset. In practice, this occurs when stamping tools are imperfectly registered (mechanical bearings, . . . ), the feed of the raw-material lurches or is subject to slippage etc. This ultimately results in different parts of the raw material being transferred relative to the markings 30. In the transferred security element 2, this manifests by the marking 30 being randomly offset. The offset can be measured to a suitable reference e.g. the contour line of the security element 2, the identification element 3 or any other part of the security device 1. As this offset is random and caused by uncontrollable or undesired factors, it is well suited as an additional and irreproducible, security feature.

Figure 6:
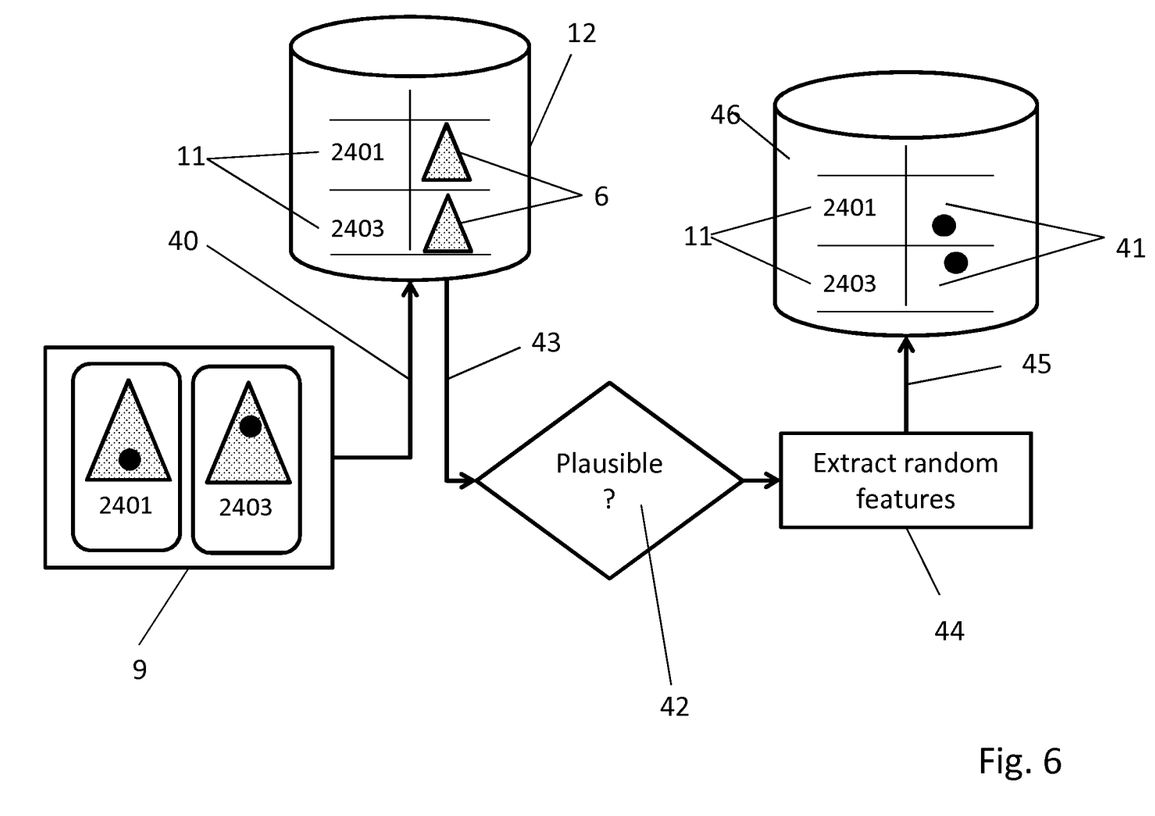

In one preferable setting, shown in FIG. 6, the present teaching may be combined with the earlier mentioned (see US 2017/0286974 A) method to register random security features, e.g. the random marker offset from FIG. 5 or to determine the offset of e.g. a uniquely identifiable marker relative to the security element outline from FIG. 4. Said registration method is pre-conditioned by a successful, preliminary initial authentication of the security device, i.e. a plausibility check. Several entities of a security device 1 may be produced 9. Their unique identifiers 11 are registered to their particular combination of security features 6 and stored 40 in a database 12. In a later conducted first authentication attempt, the plausibility 42 check according to US 2017/0286974 A is carried out by using 43 the information from the database 12. The authentication attempt may be conducted by a computer program operated on a programmable device comprising a camera, e.g. a smart phone. Said programmable device comprising a camera verifies the authenticity of the security device according to the method presented in this present teaching, i.e. by transmitting the identifier and the security features to the database in order to determine whether a corresponding coupling is registered. At least two scenarios are possible; The programmable device may be configured to request the coupling-information from the data base 12 and verify that the security features extracted from the at least one security element 2 by optical means match the particular combination of security features 6. In a second possible setting, the programmable device may be configured to extract the security features from the at least one security element 2 by optical means and then transmit the extracted identifier 11 together with the extracted security features to a database 12. The database is then configured to verify whether the received information matches the corresponding coupling. A positive match indicates a positive preliminary authentication/plausibility check. The programmable device comprising a camera is also configured to extract the random features 41, e.g. the offset of the markers 30. The random features of the security device 1 are then stored 45 in a random-feature database 46 indexed by the same identifier 11. Therefore the present teaching can be employed as an effective implementation of the plausibility check necessary as proposed in US 2017/0286974 A. In particular, due to the unpredictability of the assignment between identifier 11 and particular combination of security features 6, this method provides significantly higher security in the plausibility check when compared to using the verification of common security features shared by all security devices 1 as a plausibility check. Consequently, an attacker may not only need to re-produce or steal the same raw material 23, but he also needs to get hold of the individual genuine security devices, which should be faked. This is due to the unpredictability caused by using the stochastic selector for coupling the particular combination of security features 6 with the identifier 11.

In another preferred embodiment of the present teaching an optically variable device may be used as a security element. In particular, we will focus on diffractive optically variable devices, often referred to as holograms. While all above mentioned production processes may employ an optically variable raw material 23, we want to list some alternative manufacturing processes suited to the present teaching. We need to stress that any process, which is deterministic within some tolerance-boundaries during the manufacturing of one particular security element can be used to build the proposed system. Any process capable of producing a security element which is guaranteed to exhibit a particular combination of security features 6 chosen by a stochastic selector from the finite set 5 of known distinct combinations of security features 4 is fit to satisfy the requirements of the proposed method. As outlined earlier, the security elements may as well have additional truly random features, either interleaved or separate. Therefore, the following list should be considered as a selection of suitable processes, but the present teaching is not limited to the use of the listed ones.

In another preferred embodiment, the security element 2 is transferred to the object using injection molding. There are different variants available. One way to in-mold a security element into an object, e.g. a plastic cap, is by placing the security device in the mold before filling it with the liquid material. This basically corresponds to the bin-process introduced with FIG. 2.

Further, optically variable devices, especially diffractive ones, operate by diffraction of light using a grating or a similar 3-Dimensional structure. It is well known (see for example EP 3 093 709 A1) that the diffraction grating can be transferred to a molded part by placing a corresponding grating in the mold or structuring the mold in a way, that the final object exhibits the desired grating. Typically, molded products are produced by using a larger number of molds in parallel. As an illustrative example, we consider a production line with N=3 different molds—in real applications a significantly larger number, e.g. N=200, is used. For each mold, we can create a diffraction grating with distinct optical characteristics, thus each mold forms one particular combination of security features 6. This corresponds to the finite set 5 of known distinct combinations of security features 4. Naturally, every object produced from one particular mold exhibits a least one non-printable security element 2 sharing the same particular combination of security features 6. After the molding, the identification element 3 is applied onto the object digitally, e.g. via inkjet, laser or digital print. Similar to the process introduced in FIG. 4, a Random Number Generator 7 generates a stochastic selector 8 that is used to randomly select an identifier from a set of available identifiers. This is of practical relevance, as industrial use cases often require serialization. For example, one wants to produce one million pieces of a certain molded product in one production batch. The system is then configured to have a set of one million available serial numbers and the random number generator is configured to generate a stochastic selector to randomly select from said serial numbers.

Another beneficial embodiment of the present teaching is to generate the at least one non-printable security element using digital production means. There are several methods available. For example, for optically diffractive devices any direct-embossing technique, e.g. utilizing laser beams, lithographic beams etc., to generate diffractive gratings may be used. Naturally, as the input is generated digitally, this is a deterministic process and therefore suitable as a production method for security devices according to the present teaching.

Additionally, one may consider using other optical variable devices or materials, which are non-printable and exhibit combinations of features, which can be distinguished from a printed look-alike by optical means. Prime examples are lenticular lenses, micro-mirrors, optically variable ink, 3D-structures etc.

The security device 1 presented in this present teaching can be authenticated with similar or equal means than any other optically verifiable, random (and irreproducible) security devices. Typically, a programmable device comprising a camera is configured to use optical means to extract the identifier 11 from the identification element 3 and the combination of security features from the security element 2. It then retrieves the corresponding information from a database 12 based on the identifier 11 and verifies, that the extracted security features are sufficiently similar or equal to the particular combination of security features 6 registered to the identifier 11 in the database 12. Alternatively, the extracted information is submitted to the database 12, which returns whether a corresponding coupling is registered—confirming the authenticity.

In a preferable setting, the security device's components are designed in a way that the identifier 11 as well as the particular combination of security features 6 exhibited by the security element 2 can be captured by a programmable device comprising a camera (e.g. a smart phone or tablet computer) without any additional equipment.

The invention claimed is:

1. A method for registering an additional random security feature of a security device to an identifier of the security device in a database, comprising:
providing a security device produced according to the following:
providing at least one stochastic selector;
generating a coupling between an identifier and one particular combination of security features from a finite set of distinct combinations of security features based on the at least one stochastic selector;
registering the coupling in a database; and
applying an identification element including the identifier and a non-printable security element including the particular combination of security features according to the coupling to a substrate to produce a security device;
performing a preliminary authentication check of the security device according to the following:
determining an identifier of the security device;
determining a particular combination of security features present on the security device and selected from a finite set of distinct combinations of security features;
determining that the preliminary authentication check is positive if a coupling between the determined identifier and the determined particular combination of security features is registered in the database; and
registering the additional random security feature if the preliminary authentication check is positive;
wherein any subsequent definitive authentication check of the security device may use the registered additional random security feature.

2. The method according to claim 1, characterized by capturing the additional random security feature to be registered with a mobile user reading device and transmitting the captured additional random security feature from the mobile user reading device to the database during the performing of the method.

3. The method according to claim 2, wherein the registering the additional random security feature comprises entering the captured additional random security feature in the database and linking the captured additional random security feature to the identifier after a positive preliminary authentication check.

4. The method according to claim 1, wherein generating a coupling comprises:
providing an identifier for the security device;
selecting one particular combination of security features from a finite set of distinct combinations of security features according to the at least one stochastic selector;
coupling the provided identifier with the selected particular combination of security features.

5. The method according to claim 4, wherein the providing an identifier comprises providing a unique identifier.

6. The method according to claim 1, characterized by generating the identifier from the generated stochastic selector or one of the generated stochastic selectors for coupling with the particular combination of security features.

7. The method according to claim 1, characterized by selecting one particular identifier from a pre-defined set of available identifiers based on the generated stochastic selector or one of the generated stochastic selectors for coupling with the particular combination of security features.

8. The method according to claim 1, wherein the providing at least one stochastic selector comprises obtaining at least one stochastic selector from a random number source;
wherein the random number source is based on a hardware random number generator or on a software random number generator with an unpredictable seed.

9. The method according to claim 1, wherein the non-printable security element comprises at least one uniquely identifiable marking and the finite set of distinct combinations of security features contains available uniquely identifiable markings or possible combinations of uniquely identifiable markings;
wherein the coupling is between an identifier and one particular uniquely identifiable marking or combination of uniquely identifiable markings from a finite set of uniquely identifiable markings or combinations of uniquely identifiable markings.

10. The method according to claim 1, wherein applying the non-printable security element to a substrate comprises:
bin-like selection of a pre-produced non-printable security element; or digital foiling of the non-printable security element from a master foil; or producing the non-printable security element by direct part marking; or in-moulding the non-printable security element; or cutting the non-printable security element from a sheet-like product.

11. An authentication system comprising:

a database storing couplings between identifiers and additional random security features of security devices; and a mobile user reading device adapted to capture an identification element, a non-printable security element and an additional random security feature of a security device for authentication of the security device;

wherein:

the mobile user reading device is adapted to initiate a preliminary authentication check of the security device on the basis of a captured identification element and a captured non-printable security element;

wherein the captured identification element includes an identifier; and wherein the captured non-printable security element includes a particular combination of security features from a finite set of distinct combinations of security features;

during use, the database is searched for an entry including a coupling between the identifier and the particular combination of security features and, if a matching entry is found, the preliminary authentication check is positive; and if the preliminary authentication check is positive, the captured additional random security feature is registered in the database.

12. The system according to claim 11:

wherein the coupling is stochastic.

13. The system according to claim 11, wherein the identifier comprises a unique identifier.

14. The system according to claim 11, wherein the non-printable security element comprises at least one uniquely identifiable marking and the finite set of distinct combinations of security features contains available uniquely identifiable markings or possible combinations of uniquely identifiable markings.

* * * * *